(12) United States Patent
Lee (10) Patent No.: US 11,086,332 B2
(45) Date of Patent: Aug. 10, 2021

(54) NAVIGATION METHOD AND SYSTEM

(71) Applicants: Passion Mobility Ltd., Taipei (TW);
Chung Hsin Lee, Las Vegas, NV (US)

(72) Inventor: Chung Hsin Lee, Las Vegas, NV (US)

(73) Assignees: Passion Mobility Ltd., Taipei (TW);
Chung Hsin Lee, Las Vegas, NV (US)

( * ) Notice: Subject to any disclaimer, the term of this patent is extended or adjusted under 35 U.S.C. 154(b) by 195 days.

(21) Appl. No.: 16/512,483

(22) Filed: Jul. 16, 2019

(65) Prior Publication Data

US 2021/0018926 A1    Jan. 21, 2021

(51) Int. Cl.
*G05D 1/02* (2020.01)
*G06K 9/00* (2006.01)
*G05D 1/00* (2006.01)

(52) U.S. Cl.
CPC ......... *G05D 1/0238* (2013.01); *G05D 1/0088* (2013.01); *G05D 1/0244* (2013.01); *G06K 9/00805* (2013.01); *G05D 2201/0216* (2013.01)

(58) Field of Classification Search
CPC .. G05D 1/0238; G05D 1/0244; G05D 1/0088; G05D 1/0274; G05D 1/0234; G05D 2201/0216; G05D 2201/0207; G06K 9/00805; G06Q 10/00
See application file for complete search history.

(56) References Cited

U.S. PATENT DOCUMENTS

| | | | | |
|---|---|---|---|---|
| 4,811,229 A | * | 3/1989 | Wilson | G05D 1/0242 180/169 |
| 5,280,431 A | * | 1/1994 | Summerville | G05D 1/0246 180/168 |
| 5,367,458 A | * | 11/1994 | Roberts | G01C 15/002 180/169 |
| 2009/0088916 A1 | * | 4/2009 | Elgersma | G05D 1/106 701/23 |
| 2009/0138151 A1 | * | 5/2009 | Smid | G01S 5/0278 701/27 |
| 2017/0168496 A1 | * | 6/2017 | Yamamoto | G05D 1/0276 |
| 2018/0088583 A1 | * | 3/2018 | Wang | G05D 1/0088 |
| 2018/0267542 A1 | * | 9/2018 | Lamon | G05D 1/0272 |

FOREIGN PATENT DOCUMENTS

WO    WO 2018/051081    *    3/2018

* cited by examiner

*Primary Examiner* — Michael J Zanelli
(74) *Attorney, Agent, or Firm* — Alan D. Kamrath; Karin L. Williams; Mayer & Williams PC (57) ABSTRACT

A navigation method includes deploying a plurality of stations about a geographic area, providing the automated guided vehicle in the geographic area, transforming a position of each of the stations into a coordinate in a map, receiving a task command by the automated guided vehicle that includes an end station from one of the plurality of stations to be reached, retrieving a path parameter, identifying a start station as the closest station to the automated guided vehicle, calculating a traveling route connecting the stations by the processor of the automated guided vehicle in an order from the start station to the end station, and determining whether a physically marked line has been detected. If not, controlling the automated guided vehicle to travel along the traveling route and along moving path from one of the stations to one another of the stations with reference to the path parameters.

20 Claims, 6 Drawing Sheets

NAVIGATION METHOD AND SYSTEM

FIELD OF THE INVENTION

The present invention relates to navigation method and system, and more particularly to navigation method and system applicable to a geographic area without any physical lines or indicators.

BACKGROUND OF THE INVENTION

Automated guided vehicles (AGVs) have been widely used in indoor environments such as warehouses and manufacturing floors, or outdoor environments such as resorts, for a long period of time, and has brought countless advantages such as saving manpower, extensive amount of time and providing high reliability.

These automated guided vehicles are often navigated by various types of navigation methods, such as Global Positioning System (GPS) in outdoor environments, or using physical markers deployed on the floor for guiding automated guided vehicles maneuvering in either outdoor or indoor environments. Nevertheless, commonly used physical markers including magnetic tapes, color tapes, paint strips, reflecting material, and the like, share a common shortcoming, they all need to be physically deployed in an environment prior to operating any system that uses automated guided vehicles, which not only incurs the cost of a number of physical materials, but also requires manpower and time to complete the deployment.

SUMMARY OF THE INVENTION

In accordance with the above shortcomings, an AGV navigation system that can navigate automated guided vehicles in an environment without using physical markers, or only partially using physical markers, is provided.

An aspect of the present invention is to provide a navigation method applicable to an automated guided vehicle, the method includes deploying a plurality of stations about a geographic area; providing the automated guided vehicle in the geographic area, wherein the automated guided vehicle has a processor, a controller connected to the processor, and a sensor system connected to the processor configured to control the automated guided vehicle traveling between two of the plurality of stations by commanding the controller, and the processor in conjunction with the sensor system is capable of identifying each of the plurality of stations; transforming a position of each of the plurality of stations into a coordinate in a map accessible by the automated guided vehicle; receiving a task command by the automated guided vehicle, wherein the task command includes an end station from one of the plurality of stations to be reached; retrieving a path parameter from the task command, the map or one of the plurality of the stations, and defining a moving path between each two of the plurality of stations; identifying a start station as the closest station in the plurality of stations to the automated guided vehicle; calculating a predetermined traveling route connecting the plurality of stations by the processor of the automated guided vehicle in an order from the start station to the end station; determining, by the sensor system of the automated guided vehicle, whether a marked line is detected, in response to determining that the marked line is detected, controlling the automated guided vehicle to travel along the predetermined traveling route by referencing the marked line, and in response to determining that no marked line is detected, controlling the automated guided vehicle to travel along the predetermined traveling route and along the moving path from one of the plurality of stations to one another of the plurality of stations with reference to the path parameters.

According to an embodiment of the navigation method of the present invention, each of the path parameters includes identities of two of the plurality of stations respectively located at both ends of each moving path, and heading angle information to travel between the two stations, whereby when the automated guided vehicle travels along the predetermined traveling route and reaches one of the plurality of stations, the automated guided vehicle is guided toward the next station based on the predetermined traveling route, the moving path, with reference to the heading angle information thereof.

According to an embodiment of the navigation method of the present invention, the navigation method further includes approaching the start station by the automated guided vehicle and verifying the start station with an identity information acquired by retrieving data from an identity tag disposed on each of the plurality of stations, wherein the identity tag includes QR code, RFID tag, NFC tag, or the combinations thereof.

According to an embodiment of the navigation method of the present invention, the navigation method further includes determining a center line of the station that the automated guided vehicle is heading to from an at least one of a plurality of images continuously captured by a camera of the sensor system and connected to the processor while the automated guided vehicle travels from one of the plurality of stations to one another of the plurality of stations with a predetermined image capturing rate, wherein at least one of the plurality of images includes one of the plurality of stations which the automated guided vehicle is heading to; and in response to determining that the deviation of the center line of the station the automated guided vehicle is heading to, from a middle line of each of the plurality of images, has fallen with a predetermined deviation value range, the processor commands the controller to control the automated guided vehicle to travel straight forward.

According to an embodiment of the navigation method of the present invention, in response to determining that the deviation of the center line of the station the automated guided vehicle is heading toward from the middle line of each of the plurality of images is a negative value and smaller than the predetermined deviation value range, the processor commands the controller to control the automated guided vehicle to make a turn with a first angle, and in response to determining that the deviation of the center line of the station the automated guided vehicle is heading toward from the middle line of each of the plurality of images is a positive value and greater than the predetermined deviation value range, the processor commands the controller to control the automated guided vehicle to make a turn with a second angle, wherein a difference between the first angle and the second angle is approximately 180 degrees.

According to an embodiment of the navigation method of the present invention, a turning angle of the automated guided vehicle relates to the field-of-view of the camera and an absolute value of a deviation of the center line of the station the automated guided vehicle is heading toward from the middle line of each of the plurality of images, wherein the absolute value is based on a plurality of pixels existing between the center line and the middle line in a linear direction in the at least one of the plurality of images.

According to an embodiment of the navigation method of the present invention, each of the plurality of stations has a unique geometrical pattern identifiable by the processor in conjunction with the camera, and each of the unique geometrical patterns corresponds to each of the coordinates in the map.

According to an embodiment of the navigation method of the present invention, each of the path parameters includes a predetermined distance and a predetermined width of the moving path connecting two of the plurality of stations, and the automated guided vehicle is adapted to move within a virtual path area defined by the predetermined distance and predetermined width of each path parameter and along the predetermined traveling route.

According to an embodiment of the navigation method of the present invention, in response to the automated guided vehicle reaches a boundary of the predetermined width of the virtual path at a first direction, the automated guided vehicle turns and then travels along a second direction, wherein the included angle of the first direction and the tangent of the boundary is θ degrees, and the included angle between the first direction and the second direction ranges from 90-θ degrees to 180-θ degrees.

According to an embodiment of the navigation method of the present invention, the sensor system includes an obstacle detector connected to the processor and capable of detecting an obstacle existing on the predetermined traveling route, and in response to the obstacle detector detecting the obstacle, the processor determines whether the automated guided vehicle is able to bypass the obstacle within the predetermined width, in response to determining that the automated guided vehicle is able to bypass the obstacle within the predetermined width, the processor commands the controller to control the automated guided vehicle bypassing the obstacle by moving along the periphery of the obstacle, and in response to determining that the automated guided vehicle is not able to bypass the obstacle, the automated guided vehicle moves backward to the previous station of the plurality of stations that the automated guided vehicle has traveled from, and the processor re-calculates an alternative traveling route to reach the end station from the previous station.

According to an embodiment of the navigation method of the present invention, the navigation method further includes deploying a plurality of reference units within a virtual path, wherein in response to detecting one of the plurality of reference units by the sensor system, the automated guided vehicle moves toward the one of the plurality of reference units for calibration of the movement thereof.

According to an embodiment of the navigation method of the present invention, wherein each of the reference units is made of reflective materials, and the sensor system includes an optical sensor capable of detecting the plurality of reference units.

Another aspect of the present invention is to provide a navigation system including a plurality of stations deployed about a geographic area; an automated guided vehicle disposed in the geographic area, wherein the automated guided vehicle has a processor, a controller connected to the processor, and a sensor system connected to the processor configured to control the automated guided vehicle traveling between two of the plurality of stations by commanding the controller, and the processor in conjunction with the sensor system is capable of identifying each of the plurality of stations; a map accessible by the automated guided vehicle comprising a coordinate position of each of the plurality of stations; wherein the processor of the automated guided vehicle is configured to: receive a task command by the automated guided vehicle and a path parameter defining a moving path between each two of the plurality of stations, wherein the task command includes an end station from one of the plurality of stations to be reached; identify a start station as the closest station in the plurality of stations to the automated guided vehicle; approach the automated guided vehicle toward the start station; calculate a predetermined traveling route by connecting the plurality of stations by the processor of the automated guided vehicle in an order from the start station and the end station; determine, by the sensor system of the automated guided vehicle, whether a physically marked line is detected, in response to determining that the marked line is detected, controlling the automated guided vehicle to travel along the predetermined traveling route by referencing the marked line, and in response to determining that no marked line is detected, controlling the automated guided vehicle to travel along the predetermined traveling route by defining a moving path from one of the plurality of stations to one another of the plurality of stations with reference to the path parameters.

According to an embodiment of the navigation system of the present invention, each of the path parameters includes identities of two of the plurality of stations respectively located at both ends of the path, and heading angle information to travel between the two stations, whereby when the automated guided vehicle travels along the predetermined traveling route and reaches one of the plurality of stations, the automated guided vehicle is guided toward the next station based on the predetermined traveling route and with reference to the heading angle information and the identities thereof.

According to an embodiment of the navigation system of the present invention, the processor of the automated guided vehicle is further configured to verify the start station with an identity information acquired by retrieving data from an identity tag disposed on each of the plurality of stations while the automated guided vehicle approaches the start station, wherein the identity tag includes QR code, RFID tag, NFC tag, or the combinations thereof.

According to an embodiment of the navigation system of the present invention, each of the path parameters includes a predetermined distance and a predetermined width of the virtual path connecting two of the plurality of stations, and the automated guided vehicle is adapted to move within a virtual path area defined by the predetermined distance and predetermined width of each path parameter and along the predetermined traveling route.

According to an embodiment of the navigation system of the present invention, in response to the automated guided vehicle reaches a boundary of the predetermined width of the virtual path at a first direction, the automated guided vehicle turns and then travels along a second direction, wherein the included angle of the first direction and the tangent of the boundary is θ degrees, and the included angle between the first direction and the second direction ranges from 90-θ degrees to 180-θ degrees.

According to an embodiment of the navigation system of the present invention, the sensor system includes an obstacle detector connected to the processor and capable of detecting an obstacle existing on the predetermined traveling route, and in response to the obstacle detector detecting the obstacle, the processor determines whether the automated guided vehicle is able to bypass the obstacle within the predetermined width, in response to determining that the automated guided vehicle is able to bypass the obstacle within the predetermined width, the processor commands the controller to control the automated guided vehicle bypassing the obstacle by moving along the periphery of the obstacle, and in response to determining that the automated guided vehicle is not able to bypass the obstacle, the automated guided vehicle moves backward to the previous station of the plurality of stations that the automated guided vehicle has traveled from, and the processor re-calculates an alternative traveling route to reach to the end station from the previous station.

According to an embodiment of the navigation system of the present invention, the navigation system further includes a plurality of reference units deployed along the moving path, wherein the sensor system is configured to detect the plurality of reference units; in response to detecting one of the plurality of reference units by the sensor system, the automated guided vehicle moves toward the one of the plurality of reference units for calibration of the movement thereof.

According to an embodiment of the navigation system of the present invention, each of the reference units is made of reflective materials, and the sensor system includes an optical sensor capable of detecting the plurality of reference units.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method or the system by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that when an element is referred to as being "connected" to another element, it can be directly connected to the other element or intervening elements may be present.

Figure 1:
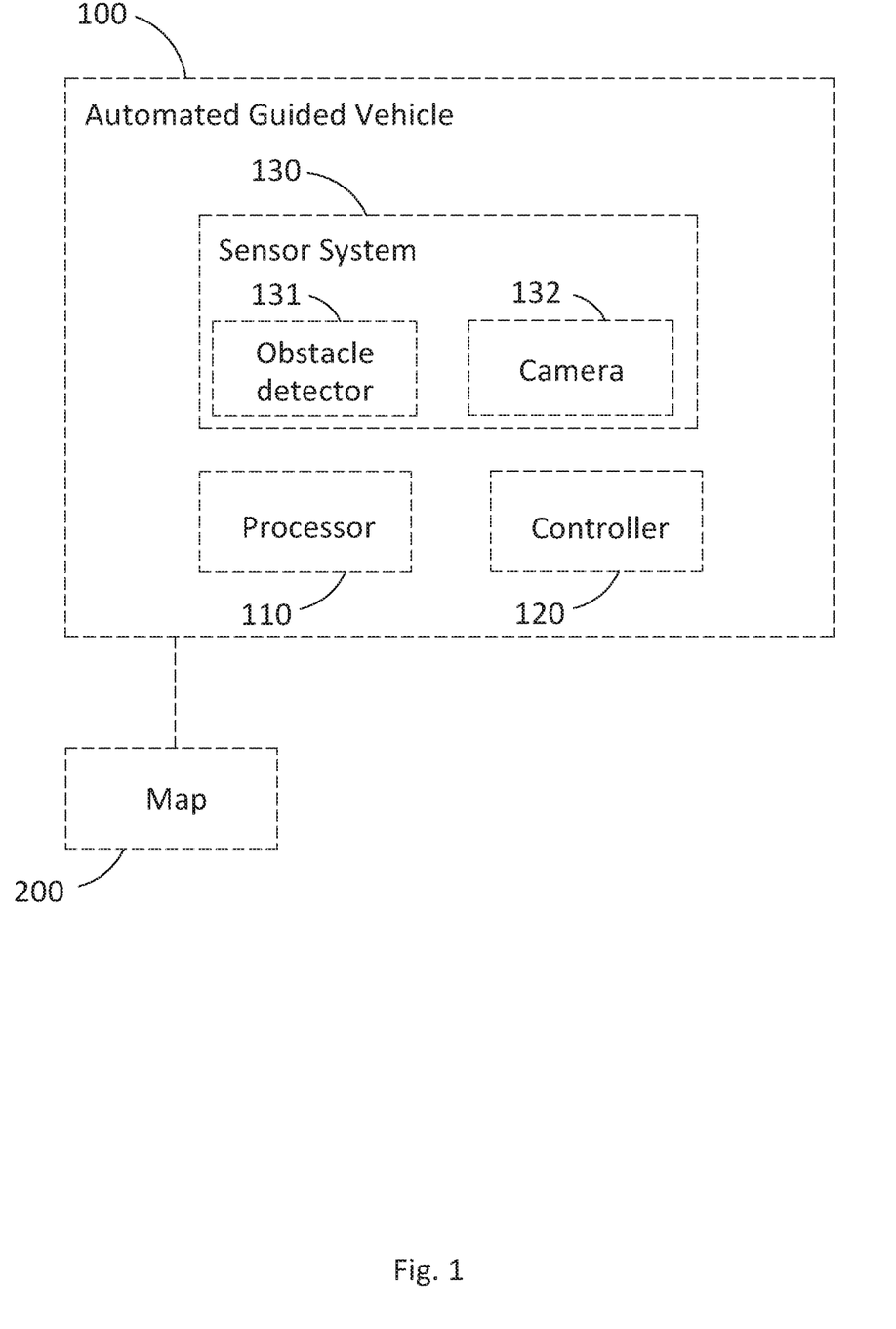
FIG. 1 is a schematic diagram illustrating an automated guided vehicle of a navigation system connecting with a map according to an embodiment of the present invention.
Figure 2:
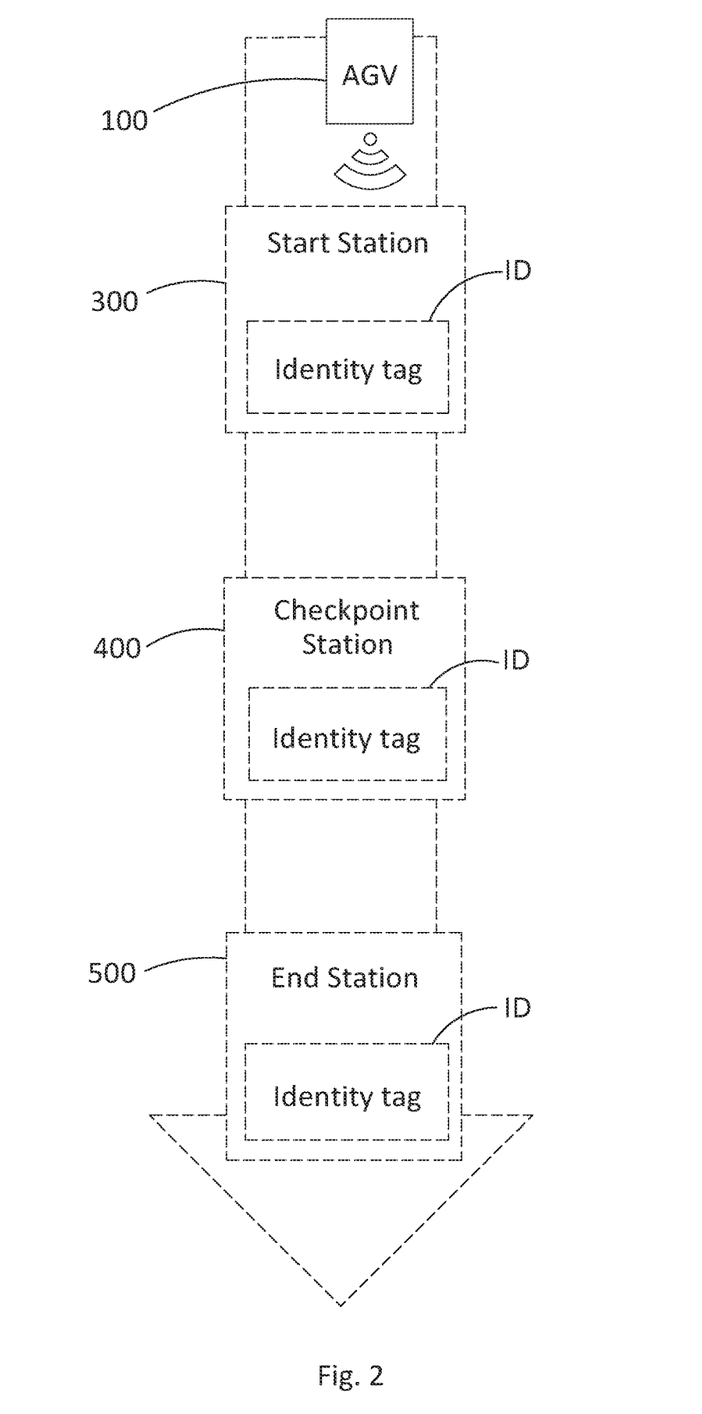
FIG. 2 is a schematic diagram illustrating an automated guided vehicle maneuvering along a predetermined traveling route of a navigation system according to an embodiment of the present invention.

FIG. 1 and FIG. 2 are schematic diagrams illustrating a navigation system according to an embodiment of the present invention. The navigation system is applicable to an automated guided vehicle 100 and includes a number of stations deployed about a geographic area, in the present embodiment, the number of stations is 3, a start station 300, an end station 500, and a checkpoint station 400 disposed between the start station 300 and the end station 500 along a predetermined traveling route. In other embodiments, more checkpoint stations can be involved along the predetermined traveling route between the start station 300 and the end station 500.

The navigation system includes at least one automated guided vehicle 100 capable of traveling within the geographic area, and the automated guided vehicle 100 includes a processor 110, a controller 120 connected to the processor 110, and a sensor system 130 connected to the processor 110 configured to control the automated guided vehicle 100 to travel from the start station 300 through the checkpoint station 400 to the end station 500. In some embodiments, the checkpoint station 400 may be omitted, so that the automated guided vehicle 100 can travel directly between the start station 300 and the end station 500.

The automated guided vehicle 100 is controlled by the controller 200 that is interoperable with the processor in conjunction with the sensor system 130. The sensor system 130 is capable of identifying each of the start station 300, the checkpoint station 400 and the end station 500. It is worth mentioning that the sensor system 130 also includes an obstacle detector 131 connected to the processor 110 and capable of detecting any obstacle existing on the predetermined traveling route.

The navigation system also includes a map 200 accessible by the automated guided vehicle 100. In other words, the map 200 can be remotely accessed by the automated guided vehicle 100; alternatively, the map 200 can be stored in a memory unit (not shown) connected with the processor 110 thereby being access by the processor 110 directly.

The map 200 includes a coordinate of each of the stations within the geographical area. The processor 110 of the automated guided vehicle 100 is configured to receive a task command by the automated guided vehicle 100, where the task command may be sent from a user and includes the coordinate of the end station 500 to be finally reached. More importantly, the map 200 includes a path parameter defining the moving path between each two of the stations, i.e. between the start station 300 and the checkpoint station 400, or between the checkpoint station 400 and the end station 500. In addition, the path parameters may be obtained while approaching any station where the automated guided vehicle 100 may retrieve such information by wireless means. In some embodiments, the path parameter can be obtained from the map 200 and the task command as well. The processor 110 of the automated guided vehicle 100 is also configured to identify the closest station from the automated guided vehicle 100 to be the start station 300 in reference with the map 200, so that it is ensured that while the automated guided vehicle 100 receives the task command, it starts maneuvering from the start station 300. While the start station 300 is identified, the processor 110 may control the automated guided vehicle 100 to approach the start station 300 by commanding the controller 120 of the automated guided vehicle 100. The start station 300 may also be verified with an identity information acquired by retrieving data from an identity tag ID disposed on each of the stations 300, 400 and 500 while the automated guided vehicle 100 moves close to the start station 300. The identity tag can be a QR code, an RFID tag, an NFC tag, or their combinations.

The processor 110 is further configured to calculate and determine the predetermined traveling route by connecting the start station 300, the checkpoint station 400 and the end station 500 in an order from the start station 300 to the end station 500, and to determine, with the sensor system 130 of the automated guided vehicle 100, whether a physically marked line such as a colored tape, a magnetic tape or the like, is detected. In response to determining that the marked line is detected, the controller controls the automated guided vehicle 100 to travel along the predetermined traveling route by referencing the marked line, and in response to determining that no marked line is detected, controlling the automated guided vehicle 100 to travel along the predetermined traveling route by moving within the moving path between the stations 300, 400 and 500 with reference to the path parameters. The moving path is a virtual path and is preferably utilized while no marked line has been detected. Each of the path parameters include identities of two of the stations respectively located at both ends of the moving path, heading angle information to travel between the two stations, and a predetermined distance and a predetermined width of the moving path connecting the two stations.

As a result, when the automated guided vehicle 100 travels along the predetermined traveling route and reaches one of the stations 300 and 400, the automated guided vehicle 100 is guided toward the next station along the predetermined traveling route with reference to the heading angle information and the identities of the stations. The automated guided vehicle 100 moves within a virtual path area of the moving path, where the virtual path area can be defined by the predetermined distance and the predetermined width according to the path parameters. In some situations, when the automated guided vehicle 100 reaches a boundary of the predetermined width of the virtual path at a first direction, the automated guided vehicle will turn and then travel in a second direction, in which while the included angle of the first direction and the tangent of the boundary is defined as θ degrees, the included angle between the first direction and the second direction ranges from 90-θ degrees to 180-θ degrees, so that the automated guided vehicle 100 may travel with a Z-shape movement. Moreover, while the obstacle detector 131 detects an obstacle, the processor 110 of the automated guided vehicle 100 determines whether the automated guided vehicle 100 is able to bypass the obstacle within the predetermined width, and if the automated guided vehicle 100 is able to bypass the obstacle within the predetermined width, the processor 110 commands the controller 120 to control the automated guided vehicle 100 bypassing the obstacle by moving along the periphery of the obstacle, and if the processor 110 determines that the automated guided vehicle 100 is not able to bypass the obstacle, the automated guided vehicle 100 moves backward to the previous station where the automated guided vehicle 100 traveled from, and the processor 110 re-calculates an alternative traveling route in order to reach the end station 500 from the previous station.

In some embodiments, the navigation system may also include a number of reference units (not shown) deployed within the moving path along the predetermined traveling route, where the sensor system 130 may include an optical sensor configured to detect the reference units. More specifically, in response to detecting one of the reference units by the sensor system 130 closest to the automated guided vehicle 100 along the predetermined traveling route, the automated guided vehicle 100 moves toward the reference unit for adjustment of its current movement, so that the automated guided vehicle 100 can stay on track. Each of the reference units can be made of reflective materials, and the sensor system 130 may include a camera 132 capable of detecting the reference units. Furthermore, the camera 132 may also be utilized for assisting the automated guided vehicle 100 to maintain its path along the predetermined traveling route toward the next station along the predetermined traveling route. Specifically, the camera 132 is interoperable with the processor 110 for determining a center line of the station that the automated guided vehicle 100 is heading to from the at least one of the images continuously captured by the camera 132 with a predetermined image capturing rate while the automated guided vehicle 100 travels from one station to one another, and at least one of the captured images shows the station which the automated guided vehicle 100 is heading to. The processor 110 is capable of determining whether the deviation of the center line of the station the automated guided vehicle is heading to, from a middle line of each of the images, has fallen within a predetermined deviation value range; if so, the processor 110 may send out commands to the controller 120 to control the automated guided vehicle 100 to travel straight forward or to maintain the current heading of the automated guided vehicle. In addition, if the processor 110 determines that the deviation of the center line of the station the automated guided vehicle 100 is heading toward from the middle line of the image is a negative value and smaller than the predetermined deviation value range, the processor may send out commands to the controller to control the automated guided vehicle 100 to make a turn with a first angle, and if the processor 110 determines that the deviation of the center line of the station the automated guided vehicle 100 is heading to from the middle line of each of the plurality of images is a positive value and greater than the predetermined deviation value range, the processor 110 may send out commands to the controller 120 to control the automated guided vehicle 100 to make a turn with a second angle, where the difference between the first angle and the second angle is smaller than or equal to 180 degrees.

The aforementioned angles of the automated guided vehicle 100 may relate to the field-of-view of the camera 130 and an absolute value of a deviation of the center line of the station the automated guided vehicle 100 is heading to from the middle line of each of the images, where the absolute value is based on a number of pixels existing between the center line and the middle line in a linear direction in the images.

What is more, each of the stations may be labeled with a unique geometrical pattern identifiable by the processor 110 in conjunction with the camera 132, and each of the unique geometrical patterns corresponds to each of the coordinates in the map 200, so that the processor 110 can identify the stations by processing the images captured by the camera 132.

Figure 3:
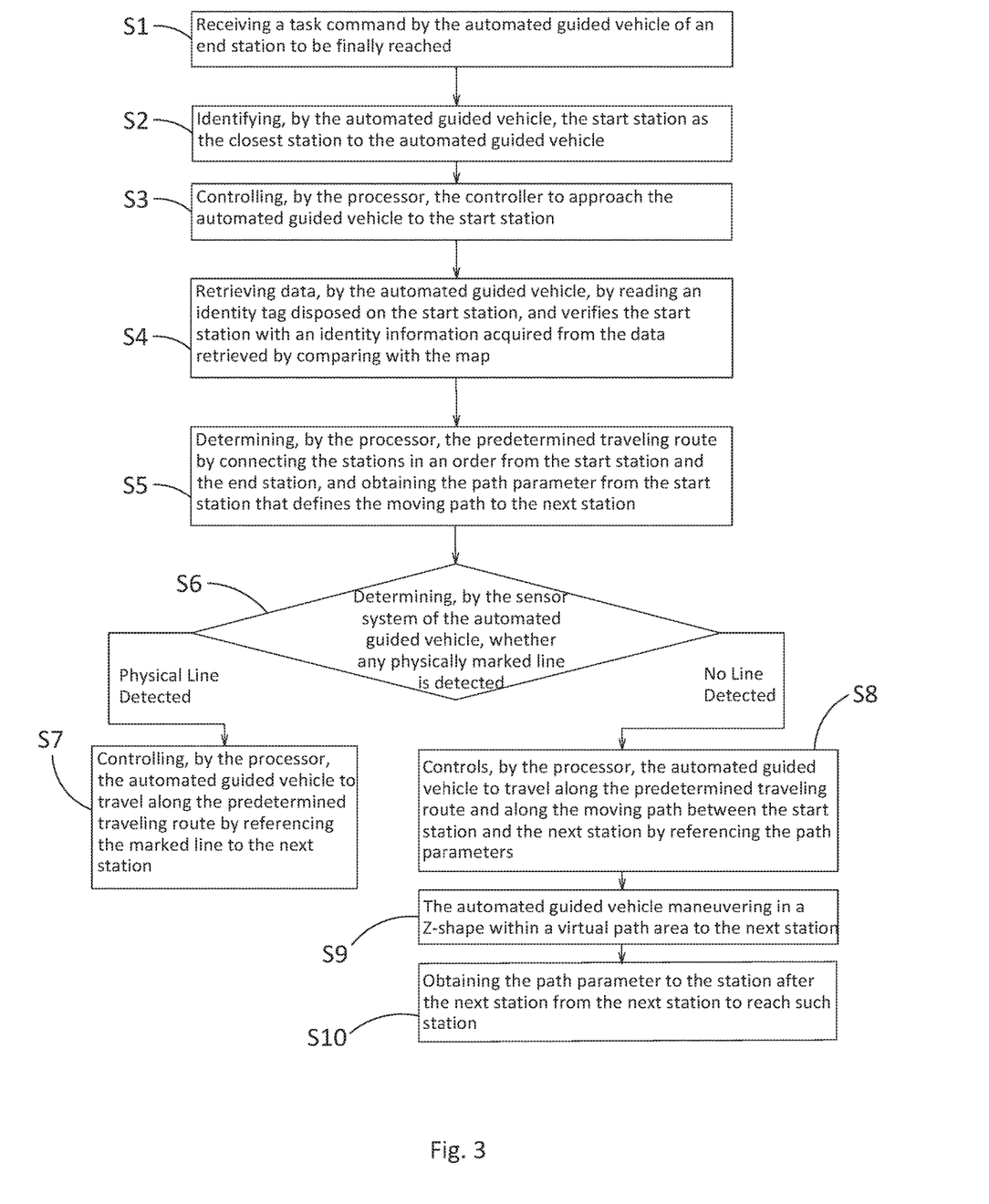
FIG. 3 is a flow chart illustrating a method utilizing the automated navigation system according to an embodiment of the present invention.

FIG. 3 is a flow chart illustrating a method utilizing the automated navigation system according to an embodiment of the present invention, and the method includes the following steps:

Step S1, the automated guided vehicle 100 receives a task command, where the task command includes the end station 500 from one of the stations to be reached;

Step S2, the processor 110 of the automated guided vehicle 100 identifies the start station 300 as the closest station to the automated guided vehicle 100;

Step S3, the processor 110 controls the controller 120 to approach the automated guided vehicle 100 to the start station 300;

Step S4, the automated guided vehicle 100 retrieves data by reading an identity tag disposed on the start station 300, and verifies the start station 300 with an identity information acquired from the data retrieved by comparing with the map 200.

Step S5, the processor 110 of the automated guided vehicle 100 determines the predetermined traveling route by connecting the stations in an order from the start station 300 and the end station 500, and obtain the path parameter that defines the moving path to the next station (checkpoint station 400) from the start station 300;

Step S6, the sensor system 130 of the automated guided vehicle 100 determines whether any physically marked line is detected, in response to determining that the marked line is detected, step S7 is performed and that the processor 110 controls the automated guided vehicle 100 to travel along the predetermined traveling route by referencing the marked line to the next station, which is the checkpoint station 400 in the present embodiment, and in response to determining that no marked line is detected, step S8 is performed and that the processor 110 controls the automated guided vehicle 100 to travel along the predetermined traveling route and along the moving path between the start station 300 and the checkpoint station 400 by referencing the path parameters, where each path parameter is obtained from the station which the automated guided vehicle 100 is heading to along the predetermined traveling route while the automated guided vehicle 100 approaches and reads such information from such station. In some embodiments, the path parameters can be obtained from either the map 200 or the task command as well.

Step S9, the processor 110 of the automated guided vehicle 100 calculates the virtual path area by the information provided by the path parameters such as the predetermined distance and predetermined width and the predetermined distance. When the automated guided vehicle 100 reaches a boundary of the predetermined width of the virtual path at a first direction, the automated guided vehicle will turn and then travel in a second direction, in which while the included angle of the first direction and the tangent of the boundary is defined as θ degrees, the included angle between the first direction and the second direction ranges from 90-θ degrees to 180-θ degrees, so that the automated guided vehicle 100 may travel with a Z-shape movement within the virtual path area.

While the checkpoint station 400 has been reached, step S10 is performed, the information provided by the checkpoint station further guides the automated guided vehicle 100 to change or remain its direction to reach the end station 500 along the predetermined traveling route and within the virtual path area between the checkpoint station 400 and the end station 500.

Figure 4:
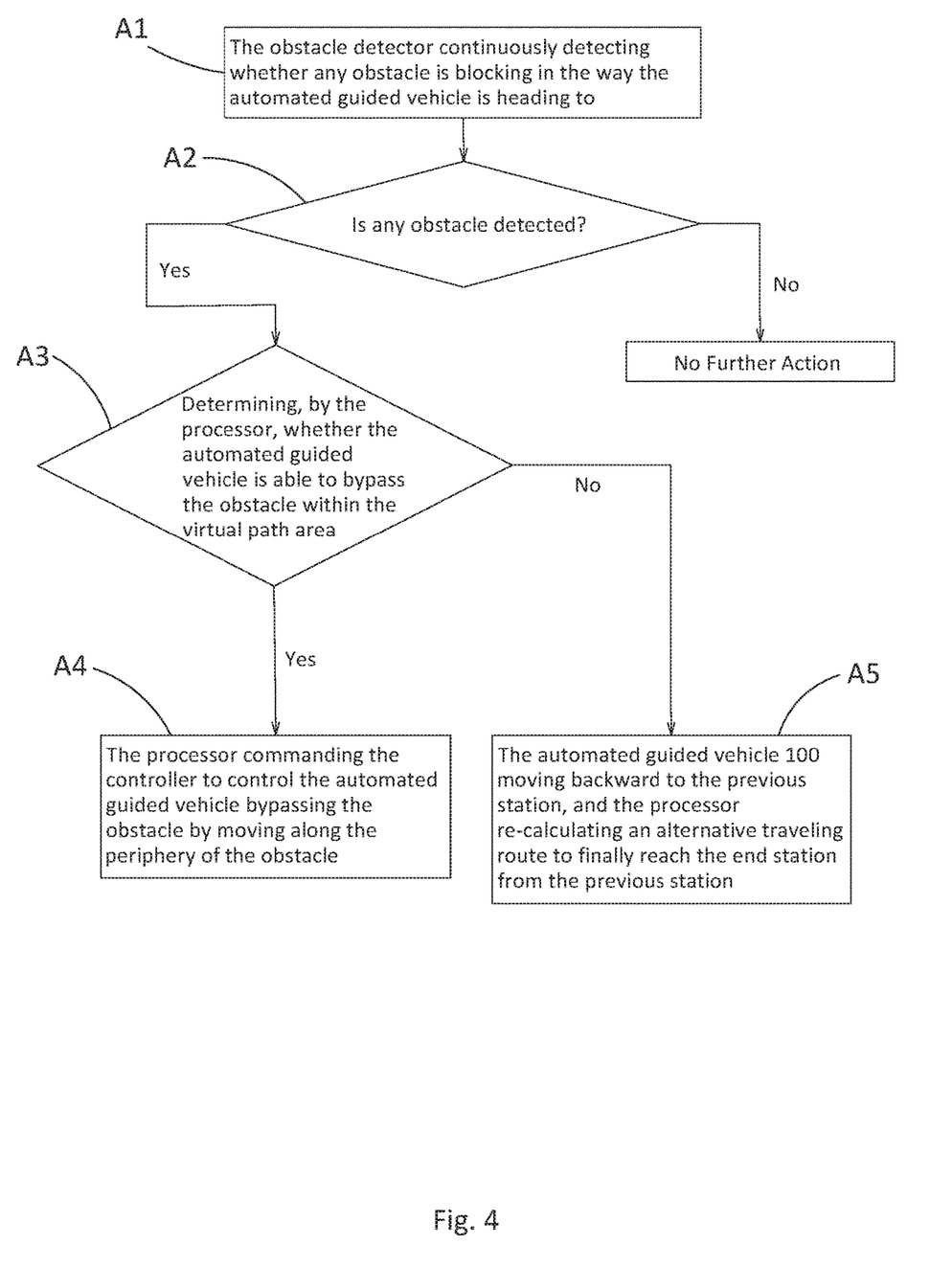
FIG. 4 is a flow chart illustrating an obstacle avoiding mechanism according to an embodiment of the present invention.

FIG. 4 is a flow chart illustrating an obstacle avoiding mechanism of the automated guided vehicle according to an embodiment of the present invention. During the maneuvering of the automated guided vehicle 100 along the predetermined traveling route, step A1 is performed, where the obstacle detector 131 continues to detect whether any obstacle is blocking in the way the automated guided vehicle 100 is heading to; if any obstacle is detected (step A2), step A3 is performed, the processor 110 determines whether the automated guided vehicle 100 is able to bypass the obstacle within the virtual path area, and if the automated guided vehicle 100 is able to bypass the obstacle, step A4 is performed, the processor 110 commands the controller 120 to control the automated guided vehicle 100 bypassing the obstacle by moving along the periphery of the obstacle, and if the processor 110 determines that the automated guided vehicle 100 is not able to bypass the obstacle, step A5 is performed, the automated guided vehicle 100 moves backward to the previous station, which is the start station 300 in this embodiment where the automated guided vehicle 100 has traveled from, and the processor 110 re-calculates an alternative traveling route to finally reach the end station 500 from the previous station, i.e. the start station 300.

Figure 5:
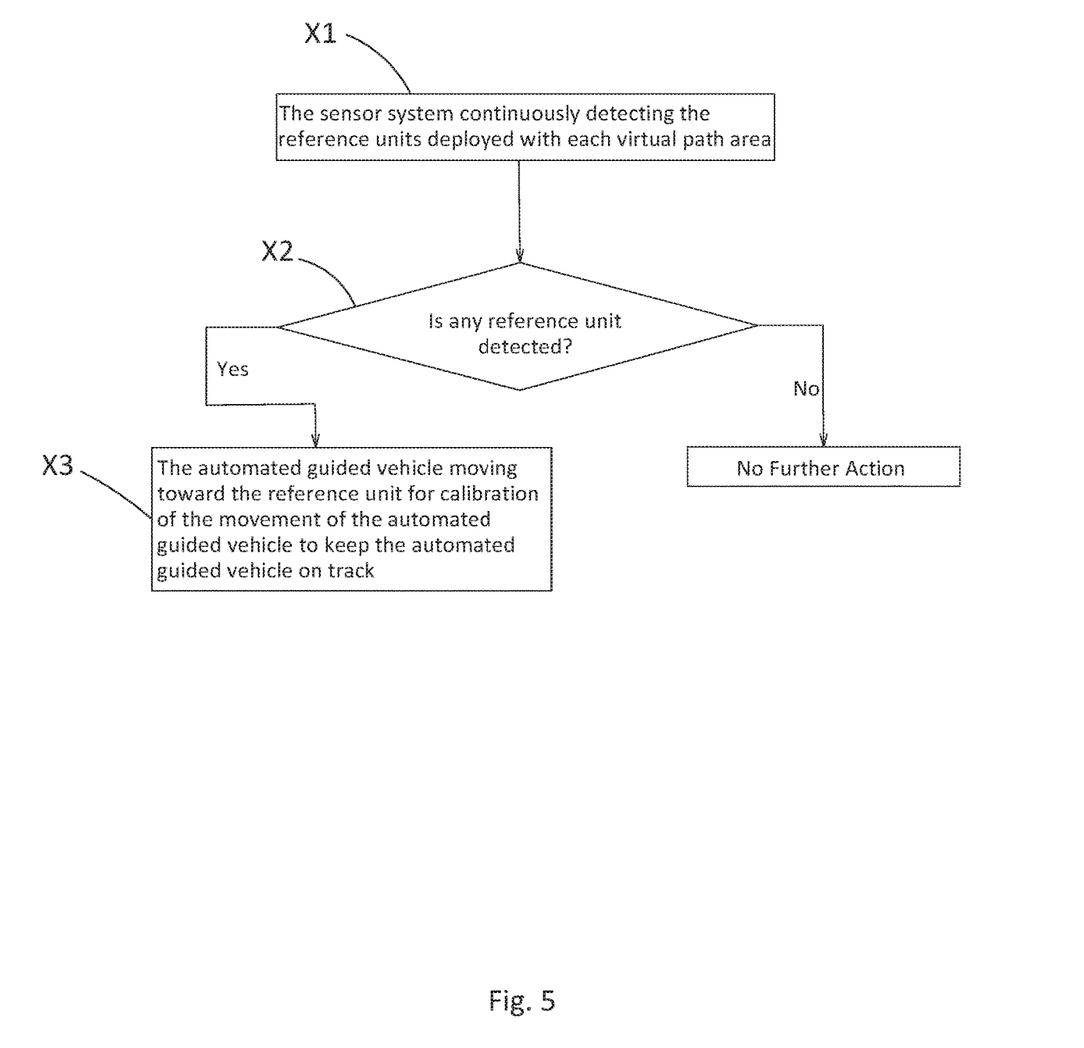
FIG. 5 is a flow chart illustrating an auxiliary movement adjustment mechanism of the automated guided vehicle according to an embodiment of the present invention.

FIG. 5 is a flow chart illustrating an auxiliary movement adjustment mechanism of the automated guided vehicle 100 according to an embodiment of the present invention. The sensor system 130 continuously detects the reference units deployed with each virtual path area (step X1); in response to detecting one of the plurality of reference units by the sensor system (X2), the automated guided vehicle moves toward the one of the plurality of reference units for calibration of the movement of the automated guided vehicle 100 (step X3), to keep the automated guided vehicle 100 on track.

Figure 6:
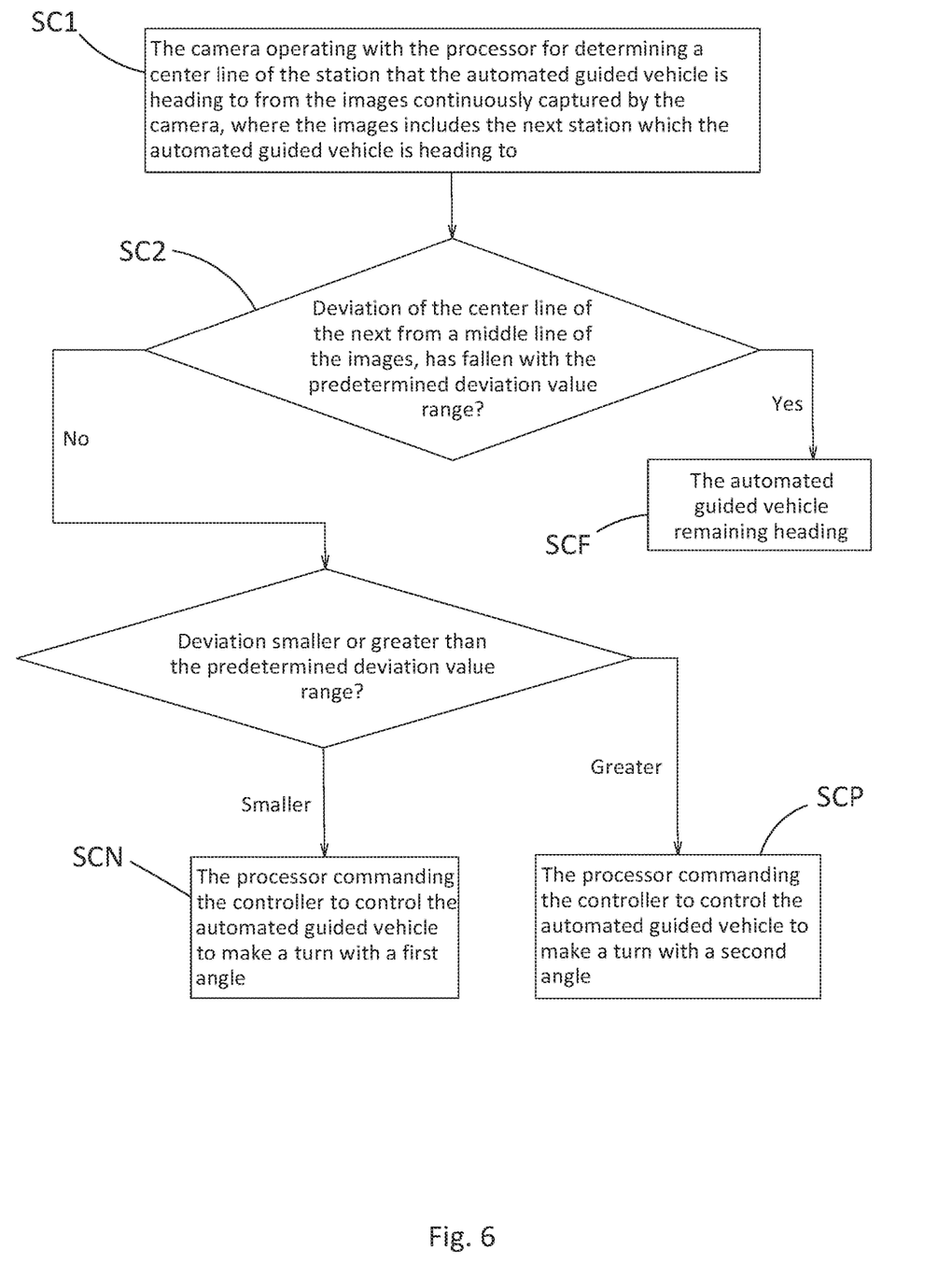
FIG. 6 is a flow chart illustrating another auxiliary movement adjustment mechanism of the automated guided vehicle according to an embodiment of the present invention.

FIG. 6 is a flow chart illustrating another auxiliary movement adjustment mechanism of the automated guided vehicle 100 according to an embodiment of the present invention. The automated guided vehicle 100 travels between two stations, step SC1 is performed, in which the camera 132 operates with the processor 110 for determining a center line of the station that the automated guided vehicle is heading to from the images continuously captured by the camera 132 with the predetermined image capturing rate, such as 1 frames/images per second, or 5 frames/images per second, where the images includes the next station which the automated guided vehicle is heading to; and in response to determining that the deviation of the center line of the next station the automated guided vehicle 100 is heading to, from a middle line of the images, has fallen with the predetermined deviation value range (step SC2), step SCF is performed, in which the processor 110 commands the controller 120 to control the automated guided vehicle 100 to travel straight forward or remain its current heading. In response to determining that the deviation of the center line of the next station the automated guided vehicle 100 is heading toward from the middle line of the images is a negative value and smaller than the predetermined deviation value range, step SCN is performed, in which the processor 110 commands the controller 120 to control the automated guided vehicle 100 to make a turn with the first angle, and in response to determining that the deviation of the center line of the next station the automated guided vehicle is heading to from the middle line of the images is a positive value and greater than the predetermined deviation value range, step SCP is performed, in which the processor 110 commands the controller 120 to control the automated guided vehicle 100 to make a turn with the second angle.

By practicing the system and method of the present invention, physical markers can be omitted to maneuver automated guided vehicles, so that the costs of building up the maneuvering environment can be saved.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. For example, specific values given herein are illustrative unless identified as being otherwise, and may be varied as a matter of design consideration. Terms such as "target" and "background" or so are distinguishing terms and are not to be construed to imply an order or a specific part of the whole. These and other variations and modifications of the embodiments disclosed herein, including of the alternatives and equivalents of the various elements of the embodiments, may be made without departing from the scope and spirit of the invention, including the invention as set forth in the following claims.

What is claimed is:

1. A navigation method applicable to an automated guided vehicle, comprising:
    deploying a plurality of stations about a geographic area;
    providing the automated guided vehicle in the geographic area, wherein the automated guided vehicle has a processor, a controller connected to the processor, and a sensor system connected to the processor configured to control the automated guided vehicle traveling between two of the plurality of stations by commanding the controller, and the processor in conjunction with the sensor system is capable of identifying each of the plurality of stations;
    transforming a position of each of the plurality of stations into a coordinate in a map accessible by the automated guided vehicle;
    receiving a task command by the automated guided vehicle, wherein the task command includes an end station from one of the plurality of stations to be reached;
    retrieving a path parameter from the task command, the map or one of the plurality of the stations, and defining a moving path between each two of the plurality of stations;
    identifying a start station as the closest station in the plurality of stations to the automated guided vehicle;
    calculating a predetermined traveling route connecting the plurality of stations by the processor of the automated guided vehicle in an order from the start station to the end station; and
    determining, by the sensor system of the automated guided vehicle, whether a marked line is detected, in response to determining that the marked line is detected, controlling the automated guided vehicle to travel along the predetermined traveling route by referencing the marked line, and in response to determining that no marked line is detected; controlling the automated guided vehicle to travel along the predetermined traveling route and along the moving path from one of the plurality of stations to one another of the plurality of stations with reference to the path parameters.

2. The navigation method as claimed in claim 1, wherein each of the path parameters includes identities of two of the plurality of stations respectively located at both ends of each moving path, and heading angle information to travel between the two stations, whereby when the automated guided vehicle travels along the predetermined traveling route and reaches one of the plurality of stations, the automated guided vehicle is guided toward the next station based on the predetermined traveling route, the moving path, with reference to the heading angle information thereof.

3. The navigation method as claimed in claim 1, further comprising approaching the start station by the automated guided vehicle and verifying the start station with an identity information acquired by retrieving data from an identity tag disposed on each of the plurality of stations, wherein the identity tag includes QR code, RFID tag, NFC tag, or the combinations thereof.

4. The navigation method as claimed in claim 1, further comprising:
    determining a center line of the station that the automated guided vehicle is heading to from an at least one of a plurality of images continuously captured by a camera of the sensor system and connected to the processor while the automated guided vehicle travels from one of the plurality of stations to one another of the plurality of stations with a predetermined image capturing rate, wherein at least one of the plurality of images includes one of the plurality of stations which the automated guided vehicle is heading to; and
    in response to determining that the deviation of the center line of the station the automated guided vehicle is heading to, from a middle line of each of the plurality of images, has fallen with a predetermined deviation value range, the processor commands the controller to control the automated guided vehicle to travel straight forward.

5. The navigation method as claimed in claim 4, wherein in response to determining that the deviation of the center line of the station the automated guided vehicle is heading toward from the middle line of each of the plurality of images is a negative value and smaller than the predetermined deviation value range, the processor commands the controller to control the automated guided vehicle to make a turn with a first angle, and in response to determining that the deviation of the center line of the station the automated guided vehicle is heading toward from the middle line of each of the plurality of images is a positive value and greater than the predetermined deviation value range, the processor commands the controller to control the automated guided vehicle to make a turn with a second angle, wherein a difference between the first angle and the second angle is approximately 180 degrees.

6. The navigation method as claimed in claim 5, wherein a turning angle of the automated guided vehicle relates to the field-of-view of the camera and an absolute value of a deviation of the center line of the station the automated guided vehicle is heading toward from the middle line of each of the plurality of images, wherein the absolute value is based on a plurality of pixels existing between the center line and the middle line in a linear direction in the at least one of the plurality of images.

7. The navigation method as claimed in claim 6, wherein each of the plurality of stations has a unique geometrical pattern identifiable by the processor in conjunction with the camera, and each of the unique geometrical patterns corresponds to each of the coordinates in the map.

8. The navigation method as claimed in claim 1, wherein each of the path parameters includes a predetermined distance and a predetermined width of the moving path connecting two of the plurality of stations, and the automated guided vehicle is adapted to move within a virtual path area defined by the predetermined distance and predetermined width of each path parameter and along the predetermined traveling route.

9. The navigation method as claimed in claim 8, wherein in response to the automated guided vehicle reaches a boundary of the predetermined width of the virtual path at a first direction, the automated guided vehicle turns and then travels along a second direction, wherein the included angle of the first direction and the tangent of the boundary is θ degrees, and the included angle between the first direction and the second direction ranges from 90-θ degrees to 180-θ degrees.

10. The navigation method as claimed in claim 8, wherein the sensor system includes an obstacle detector connected to the processor and capable of detecting an obstacle existing on the predetermined traveling route, and in response to the obstacle detector detecting the obstacle, the processor determines whether the automated guided vehicle is able to bypass the obstacle within the predetermined width, in response to determining that the automated guided vehicle is able to bypass the obstacle within the predetermined width, the processor commands the controller to control the automated guided vehicle bypassing the obstacle by moving along the periphery of the obstacle, and in response to determining that the automated guided vehicle is not able to bypass the obstacle, the automated guided vehicle moves backward to the previous station of the plurality of stations that the automated guided vehicle has traveled from, and the processor re-calculates an alternative traveling route to reach the end station from the previous station.

11. The navigation method as claimed in claim 1, further comprising:
deploying a plurality of reference units within path area defined by a predetermined distance and predetermined width of each path parameter and along a predetermined traveling route, wherein in response to detecting one of the plurality of reference units by the sensor system, the automated guided vehicle moves toward the one of the plurality of reference units for calibration of the movement thereof.

12. The navigation method as claimed in claim 11, wherein each of the reference units is made of reflective materials, and the sensor system includes an optical sensor capable of detecting the plurality of reference units.

13. A navigation system, comprising:
a plurality of stations deployed about a geographic area;
an automated guided vehicle disposed in the geographic area, wherein the automated guided vehicle has a processor, a controller connected to the processor, and a sensor system connected to the processor configured to control the automated guided vehicle traveling between two of the plurality of stations by commanding the controller, and the processor in conjunction with the sensor system is capable of identifying each of the plurality of stations;
a map accessible by the automated guided vehicle comprising a coordinate position of each of the plurality of stations;
wherein the processor of the automated guided vehicle is configured to:
receive a task command by the automated guided vehicle and a path parameter defining a moving path between each two of the plurality of stations, wherein the task command includes an end station from one of the plurality of stations to be reached;
identify a start station as the closest station in the plurality of stations to the automated guided vehicle;
approach the automated guided vehicle toward the start station;
calculate a predetermined traveling route by connecting the plurality of stations by the processor of the automated guided vehicle in an order from the start station and the end station;
determine, by the sensor system of the automated guided vehicle, whether a physically marked line is detected, in response to determining that the marked line is detected, controlling the automated guided vehicle to travel along the predetermined traveling route by referencing the marked line, and in response to determining that no marked line is detected, controlling the automated guided vehicle to travel along the predetermined traveling route by defining a moving path from one of the plurality of stations to one another of the plurality of stations with reference to the path parameters.

14. The navigation system as claimed in claim 13, wherein each of the path parameters includes identities of two of the plurality of stations respectively located at both ends of the path, and heading angle information to travel between the two stations, whereby when the automated guided vehicle travels along the predetermined traveling route and reaches one of the plurality of stations, the automated guided vehicle is guided toward the next station based on the predetermined traveling route and with reference to the heading angle information and the identities thereof.

15. The navigation system as claimed in claim 13, wherein the processor of the automated guided vehicle is further configured to verify the start station with an identity information acquired by retrieving data from an identity tag disposed on each of the plurality of stations while the automated guided vehicle approaches the start station, wherein the identity tag includes QR code, RFID tag, NFC tag, or the combinations thereof.

16. The navigation system as claimed in claim 13, wherein each of the path parameters includes a predetermined distance and a predetermined width of the virtual path connecting two of the plurality of stations, and the automated guided vehicle is adapted to move within a virtual path area defined by the predetermined distance and predetermined width of each path parameter and along the predetermined traveling route.

17. The navigation system as claimed in claim 16, wherein in response to the automated guided vehicle reaches a boundary of the predetermined width of the virtual path at a first direction, the automated guided vehicle turns and then travels along a second direction, wherein the included angle of the first direction and the tangent of the boundary is θ degrees, and the included angle between the first direction and the second direction ranges from 90-θ degrees to 180-θ degrees.

18. The navigation system as claimed in claim 16, wherein the sensor system includes an obstacle detector connected to the processor and capable of detecting an obstacle existing on the predetermined traveling route, and in response to the obstacle detector detecting the obstacle, the processor determines whether the automated guided vehicle is able to bypass the obstacle within the predetermined width, in response to determining that the automated guided vehicle is able to bypass the obstacle within the predetermined width, the processor commands the controller to control the automated guided vehicle bypassing the obstacle by moving along the periphery of the obstacle, and in response to determining that the automated guided vehicle is not able to bypass the obstacle, the automated guided vehicle moves backward to the previous station of the plurality of stations that the automated guided vehicle has traveled from, and the processor re-calculates an alternative traveling route to reach to the end station from the previous station.

19. The navigation system as claimed in claim 13, further comprising:
    a plurality of reference units deployed along the moving path, wherein the sensor system is configured to detect the plurality of reference units; in response to detecting one of the plurality of reference units by the sensor system, the automated guided vehicle moves toward the one of the plurality of reference units for calibration of the movement thereof.

20. The navigation system as claimed in claim 19, wherein each of the reference units is made of reflective materials, and the sensor system includes an optical sensor capable of detecting the plurality of reference units.

\* \* \* \* \*